Sept. 18, 1951  C. I. BROWN, JR  2,568,609
MOUNTING BRACKET
Filed July 13, 1950  2 Sheets-Sheet 2
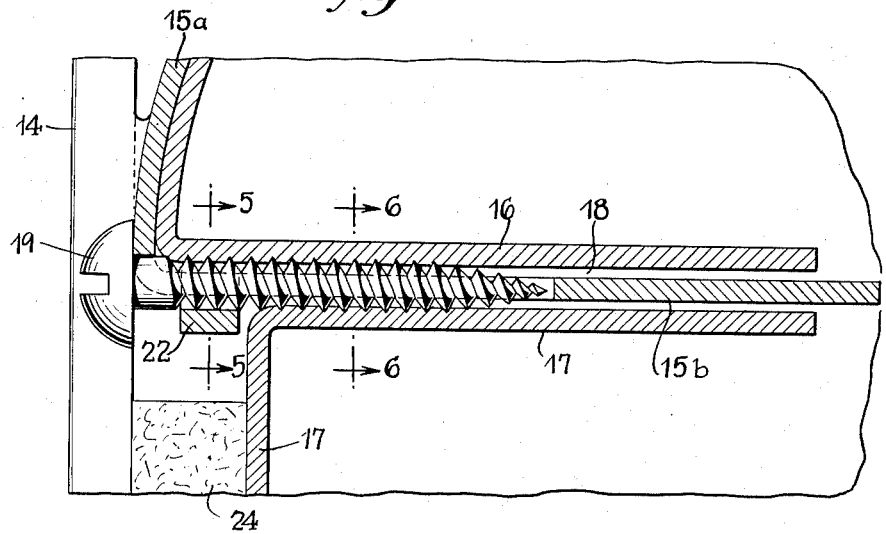
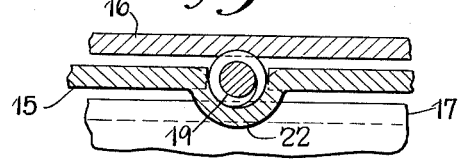
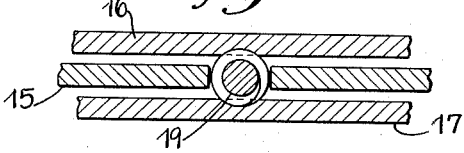
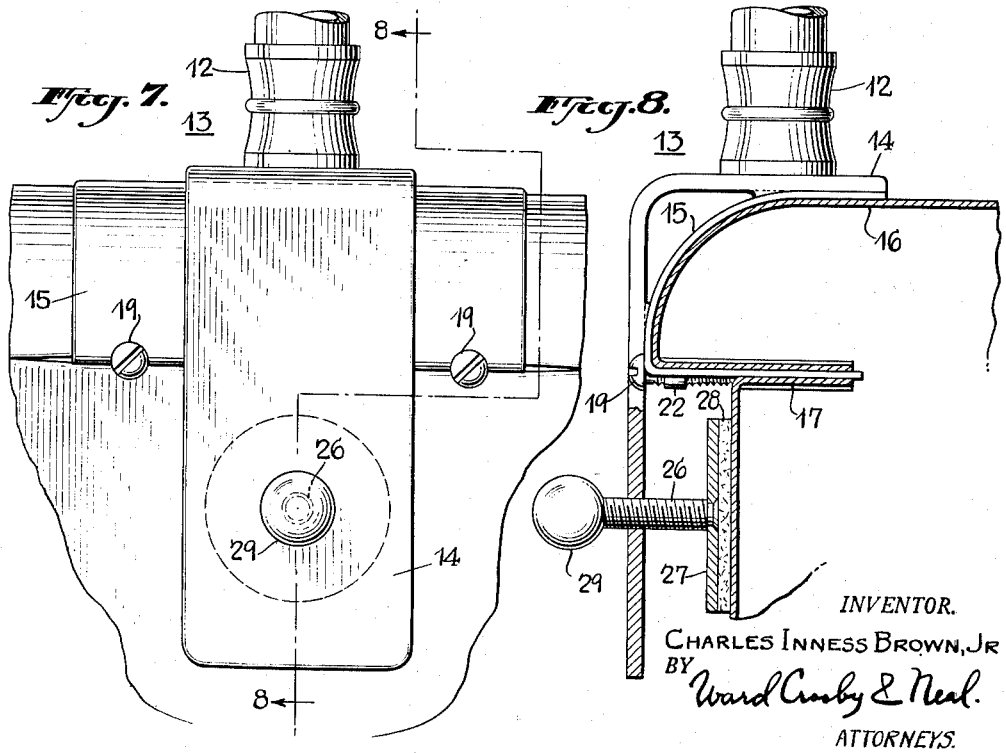
INVENTOR.
CHARLES INNESS BROWN, JR
BY Ward Crosby & Neal.
ATTORNEYS.

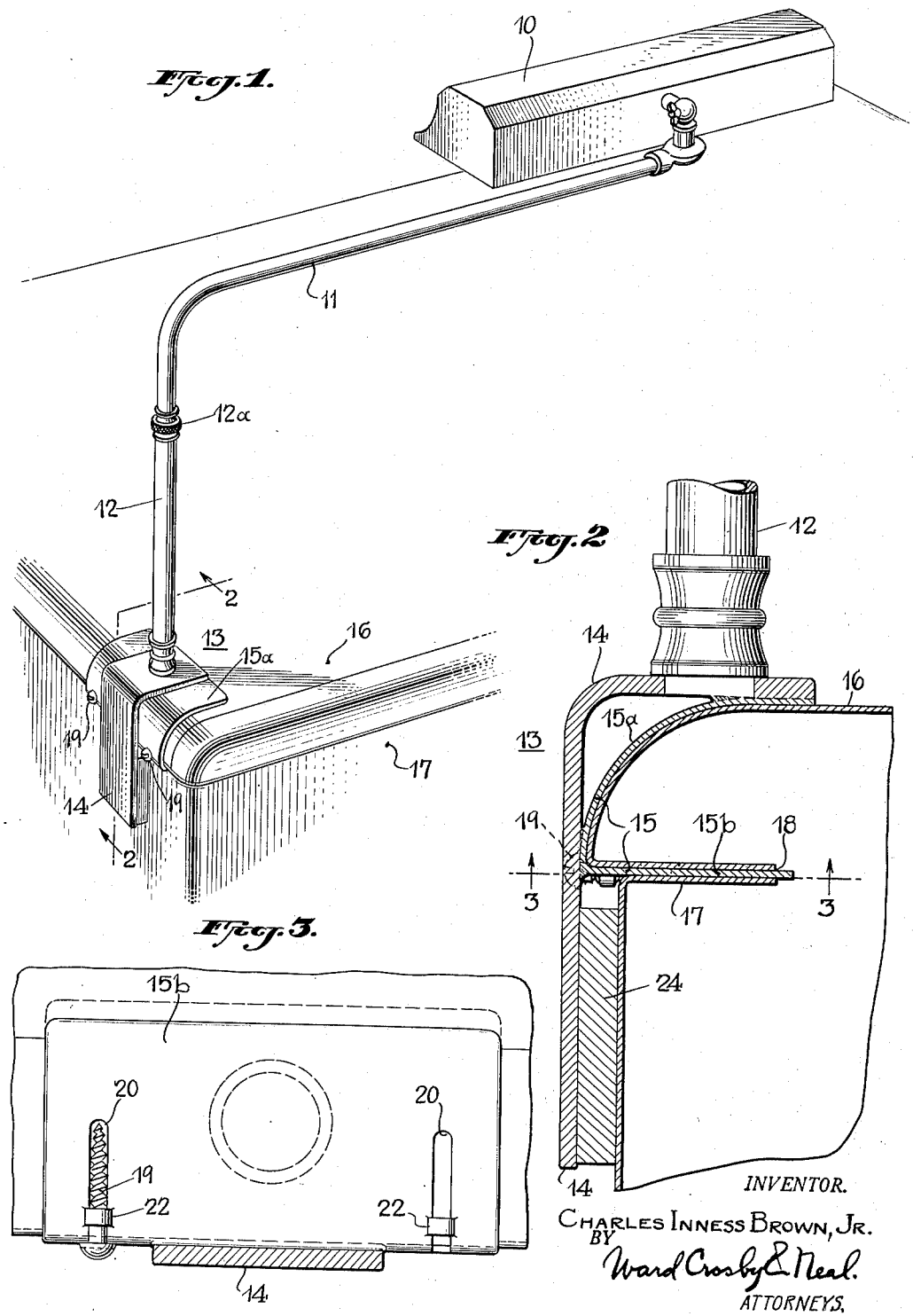

Patented Sept. 18, 1951

2,568,609

UNITED STATES PATENT OFFICE 2,568,609

MOUNTING BRACKET

Charles Inness Brown, Jr., Floral Park, N. Y.

Application July 13, 1950, Serial No. 173,591

5 Claims. (Cl. 248—289)

1

This invention relates to a mounting bracket and more particularly to a bracket for mounting an object, such as a desk lamp, on a support, such as on the edge of a desk or a table.

The bracket of the invention is peculiarly adapted to the mounting of desk lamps and the like on modern sheet metal desks the tops of which terminate substantially flush with the sides, thereby eliminating or substantially eliminating an overhang or projection of the top beyond the sides to which mounting brackets of conventional construction such as a conventional C-clamp may be attached.

In the sheet metal desks as currently constructed, however, the sheet metal top terminates in a smoothly curved edge with the free end of the metal turned in contiguous to the turned in edge of the sidewalls, forming thereby a recessed slot spaced from the top. The bracket of the invention takes advantage of this desk construction as a means of attachment thereto. To this end the bracket is made of substantially F-shaped configuration and comprises an upper arm adapted to engage the upper surface of the desk top, and a lower arm spaced therefrom adapted to enter the slotted recess referred to, these two arms being integral with a third arm substantially perpendicular thereto. In addition the lower arm is slotted for reception of screws adapted to engage one or both contiguous surfaces of the slotted recess, thereby to secure the bracket to the desk. The vertical arm of the bracket also has preferably tapped to the lower end thereof, a pressure screw terminating adjacent the desk in a pressure plate and pad integral therewith, the other end of the screw being provided with an adjusting knob.

Mounted upon and integral with the upper arm of the bracket is an upstanding socket member having a knurled friction nut tapped thereto for detachably mounting thereon the extension arm of a desk lamp or the like.

The invention thus provides a bracket which is easy to install, which is readily adapted to support objects having different mounting requirements, and which is relatively rigid and easily removed.

Other features, objects and advantages of the invention will be apparent from the following description read in connection with the accompanying drawings in which:

Fig. 1 is a perspective view of the bracket of my invention mounted on the edge of a sheet metal desk and as used to support a lamp.

Fig. 2 is a cross section of the bracket taken along the line 2—2 shown in Fig. 1. Fig. 3 is a section taken along the line 3—3 shown in Fig. 2.

Fig. 4 is an enlarged fragmentary cross section,

2 corresponding to that of Fig. 2, but showing the arrangement for forcing the bracket member into the slotted recess of the support and for anchoring it in position on the support.

Figs. 5 and 6 are partial cross sections of the bracket as taken at 5—5 and 6—6 respectively of Fig. 4.

Fig. 7 is a view in rear elevation of the preferred embodiment of the invention employing a pressure screw for holding the upper portion of the bracket tightly against the support.

Fig. 8 is a view in side elevation and partly in section of the preferred embodiment of the bracket, as taken along the line 8—8 shown in Fig. 7.

Referring to Fig. 1, there is shown a lamp comprising a shade 10 supported by an arm 11. The arm 11 extends into and is detachably mounted in a socket 12 which is secured to and forms part of a bracket in accordance with the invention, indicated generally at 13. The socket 12 may be fastened to the bracket 13 in any well known manner as, for example, by welding or riveting. For detachably securing the lamp arm 11 in socket 12, the latter has tapped to the upper end thereof a knurled friction nut 12a.

The bracket 13 is shown in the drawings mounted on a support, such as a sheet metal desk, which comprises a top 16 and a base 17. The top 16 is supported on the base 17, but a slotted recess 18 which is normally hidden from view is provided between these portions. The recess is preferably formed by spacing the portions slightly, as shown, but it may be formed in other ways and in another part of one or both of the portions.

The bracket 13 has, as indicated in Figs. 1 and 2, a generally F-shaped configuration viewed in side elevation and comprises an angle member 14 welded or otherwise fastened to a channel member 15 welded to the angle member within the angle thereof, and consisting of an upper arcuate portion 15a and a lower horizontally extending arm portion 15b. The arm portion 15b fits snugly into the desk slot or recess 18 between the desk portions 16 and 17. Screws 19 which also fit into the recess 18 engage the contiguous walls of the recess and force the arm portion 15b of the member 15 into the recess.

As shown in Fig. 3, the member 15 preferably has a pair of slots 20 formed in the arm portion 15b thereof which fits into the recess 18. These slots which permit the threads of the screws 19 to engage the contiguous surfaces of the recess 18 and also to guide the screws into the recess. U-shaped guides 22 are preferably provided integral with arm portion 15b to assist in properly aligning the screws 19 with the recess 18. These guides may extend to the outer surface of arm portion 15b, if desired, thus forming an aperture with cylindrical walls for guiding the screws 19.

Figs. 4, 5 and 6 shows the relation of the screws 19 to arm portion 15b in greater detail. The screws 19 which are preferably self-tapping, engage both contiguous surfaces of the recess 18 formed by the desk portions 16 and 17. The recess is preferably of a depth sufficient to permit several threads of the screw to engage the walls.

The heads of the screws 19 bear against the outer surface of the channel member 15, thus forcing this member against the desk top portion 16. Alternatively, the same result may be produced by having the screws 19 extend through the angle member 14 with the heads of the screws bearing against the outer surface of the member 14.

If an upward force is exerted on arm 11, the bracket will tend to pivot about the arm portion 15b of the member 15 in the recess 18. This places an undesirable strain on this portion of the member, and may deform the bracket causing it to lose contact with the top portion of desk 16 in its rest position, thereby causing the lamp to become unsteady. To relieve a part of this strain and to assist in maintaining the member 15 pressed against the desk top portion 16, a resilient pad 24, Figs. 2 and 4, may be provided between the lower portion of member 14 and the portion 17. The pad 24 which may be made of any resilient material, such as rubber or felt, is slightly thicker in its uncompressed state than the spacing between the angle member 14 and the portion 17 so that when the member 15 is forced by the screws against the desk top 16, the pad 24 presses outwardly against the member 14. This pressure against the member 14 causes the upper part of the member 15 to press against the top of the desk 16.

In the preferred embodiment of the invention shown in Figs. 7 and 8, the pad 24 is replaced by a pressure screw 26 which is threaded through the member 14. The screw 26 is rotatably secured, as shown in Fig. 8, to a pressure plate 27 which bears against a pad 28; and is provided at its opposite end with an adjusting knob 29.

When the bracket shown in Figs. 7 and 8 is installed, the screw 26 is threadably withdrawn until the plate 27 is adjacent the member 14. After member 15 has been properly positioned, as shown, and the screws 19 tightened, the screw 26 is turned until the pad 28 engages the base 17 of the desk until the desired pressure is obtained on the lower portion of member 14. The right angle portion of the member 14 between the screws 19 and the socket 12 may be omitted, or the portion of the member 15 between the screws 19 and the desk top 16 may be omitted, but in the preferred embodiment, these portions are employed to provide a more rigid bracket which conforms to the associated support surface.

I claim:

1. A mounting bracket of substantially F-shaped configuration viewed in side elevation, comprising: an upper arm adapted to engage a surface of a supporting structure, a lower arm adapted to enter a slotted recess of said structure spaced from said surface, said upper and lower arms being integral with a third arm substantially perpendicular thereto, said lower arm being slotted for reception of screws adapted to enter and engage at least one surface of said slotted recess and thereby secure said bracket to said supporting structure.

2. A mounting bracket of substantially F-shaped configuration viewed in side elevation, comprising: an upper arm adapted to engage a surface of a supporting structure, a lower arm adapted to enter a slotted recess of said structure spaced from said surface, said upper and lower arms being integral with a third arm substantially perpendicular thereto, said lower arm being slotted for reception of screws adapted to enter and engage at least one surface of said slotted recess and thereby secure said bracket to said supporting structure, and pressure screw means tapped to the portion of said third arm remote from said upper and lower arms.

3. A mounting bracket of substantially F-shaped configuration viewed in side elevation, comprising: an upper arm adapted to engage a surface of a supporting structure, a lower arm adapted to enter a slotted recess of said structure spaced from said surface, said upper and lower arms being integral with a third arm substantially perpendicular thereto, said lower arm being slotted for reception of screws adapted to enter and engage at least one surface of said slotted recess and thereby secure said bracket to said supporting structure, and means integral with said upper arm for detachably mounting an object thereon.

4. A mounting bracket comprising an angle member and a channel member, said channel member being positioned within the angle of said angle member and secured thereto to form a bracket of substantially F-shaped configuration viewed in side elevation, forming thereby an upper arm adapted to engage a surface of a supporting structure, and a lower arm adapted to enter a slotted recess of said structure spaced from said surface, the lower arm of said channel member being slotted for reception of screws adapted to enter and engage at least one surface of said slotted recess and thereby secure said braket to said supporting structure.

5. A mounting bracket comprising an angle member and a channel member, said channel member being positioned within the angle of said angle member and secured thereto to form a bracket of substantially F-shaped configuration viewed in side elevation, forming thereby an upper arm adapted to engage a surface of a supporting structure, and a lower arm adapted to enter a slotted recess of said structure spaced from said surface, the lower arm of said channel member being slotted for reception of screws adapted to enter and engage at least one surface of said slotted recess and thereby secure said bracket to said supporting structure, means integral with one arm of said angle member for detachably mounting an object thereon, and pressure screw means tapped to the remaining arm of said angle member at a point removed from said upper and lower arms.

CHARLES INNESS BROWN, Jr.

REFERENCES CITED

The following references are of record in the file of this patent:

UNITED STATES PATENTS

| Number | Name | Date |
| --- | --- | --- |
| 1,247,600 | Priddy | Nov. 20, 1917 |
| 1,467,834 | Bruck | Sept. 11, 1923 |
| 2,520,884 | Laube | Aug. 29, 1950 |